(12) United States Patent
Cooper et al.

(10) Patent No.: US 6,862,947 B2
(45) Date of Patent: Mar. 8, 2005

(54) CLAMPING MECHANISM FOR AN ADJUSTABLE STEERING COLUMN

(75) Inventors: Magnus Cooper, Coventry (GB); Colin Andrew Mitchell, Coventry (GB); David Andrew Watson, Coventry (GB)

(73) Assignee: NSK Steering Systems Europe Limited, Berkshire (GB)

( * ) Notice: Subject to any disclaimer, the term of this patent is extended or adjusted under 35 U.S.C. 154(b) by 131 days.

(21) Appl. No.: 10/300,286

(22) Filed: Nov. 21, 2002

(65) Prior Publication Data

US 2003/0094063 A1 May 22, 2003

(30) Foreign Application Priority Data

Nov. 22, 2001 (GB) .............................................. 0128012

(51) Int. Cl.⁷ ................................................ B62D 1/18
(52) U.S. Cl. ........................... 74/493; 74/492; 280/775; 280/777
(58) Field of Search .................... 74/492, 493; 280/775, 280/777

(56) References Cited

U.S. PATENT DOCUMENTS

| | | | | |
|---|---|---|---|---|
| 4,656,888 A | | 4/1987 | Schmitz ........................ | 74/493 |
| 4,774,851 A | * | 10/1988 | Iwanami et al. .............. | 74/493 |
| 5,570,610 A | | 11/1996 | Cymbal ........................ | 74/493 |
| 5,988,010 A | * | 11/1999 | Olgren ........................ | 74/493 |
| 6,036,228 A | * | 3/2000 | Olgren et al. ................ | 280/775 |
| 6,324,935 B1 | * | 12/2001 | Schoen et al. ................ | 74/493 |
| 6,530,600 B1 | * | 3/2003 | Marxer et al. .............. | 280/777 |

* cited by examiner

*Primary Examiner*—David M. Fenstermacher
(74) *Attorney, Agent, or Firm*—Miles & Stockbridge P.C.

(57) ABSTRACT

A clamping mechanism for an adjustable steering column for a vehicle includes an actuating lever for actuating a clamping device which is coupled to an operating lever to which is mounted an operating handle. The two levers are interconnected intermediate their ends such that one lever can pivot and slide in a slot relatively to the other and the lever having a moveable fulcrum to allow for adjustment of the steering column. The fulcrum of the lever is fixed and the geometry is such that the clamping device always returns to the same, fully locked position, regardless of the rake and/or reach adjustment position of the steering column.

19 Claims, 3 Drawing Sheets

CLAMPING MECHANISM FOR AN ADJUSTABLE STEERING COLUMN

BACKGROUND OF THE INVENTION

This invention relates to a clamping mechanism for an adjustable steering column for a vehicle.

Motor vehicles are commonly equipped with reach and rake adjustable steering columns. After adjustment, the column must be securely clamped in the chosen position. The clamping device is commonly actuated by means of a lever having a horizontal axis of rotation, the axis being perpendicular to the axis of the steering wheel at an upper end of the steering column.

The most commonly-used clamping devices for reach and rake adjustable steering columns are of designs which require the axis of the clamp operating lever to move relatively to the dashboard of the vehicle, the dashboard being fixed, as the column position is adjusted. If the clamp operating lever is actuated by a handle which is rigidly attached to it, then the locked position of this handle will not be consistent relative to the dashboard.

SUMMARY OF THE INVENTION

According to the present invention, there is provided A clamping mechanism for an adjustable steering column for a vehicle, the clamping mechanism including a first, actuating lever for actuating a clamping device having a first, clamped condition and a second, unclamped condition, the actuating lever being moveable between the clamped and unclamped conditions of the clamping device, and a second, operating lever for operating said first lever, the two levers being interconnected intermediate their ends such that one lever can pivot and slide relatively to the other; said first lever having a moveable fulcrum to allow for adjustment of the steering column and said second lever having a fulcrum that is fixed, in use, relatively to a dashboard of the vehicle, said second lever having a part in the region of an end of said second lever that is remote from said fixed fulcrum to constitute an operating handle for the second lever.

The first lever may have a guideway in it in which a pivot point of the second lever can pivot and slide or vice versa. The guideway may be curved. The guideway may extend along the first lever from near one end thereof that is remote from its fulcrum and towards the fulcrum. The guideway may be a slot.

The fulcrum of the first lever may be mounted so as to accommodate rake and/or reach adjustment of the steering column. The fulcrum of the first lever may pass through slots in a steering column mounting bracket to achieve this aim.

The fulcrum of the second lever may be constituted by a fixed mounting point of the second lever on the steering column mounting bracket.

When mounted in a vehicle, the second lever extends through the dashboard of the vehicle, with the operating handle of that lever being on the cabin side of the vehicle.

The geometry of the first and second levers of the clamping mechanism may be such that, when mounted in a vehicle, the operating handle for the second lever is arranged to stop in the same position relative to the dashboard when the clamping device is in its clamped condition, and when the handle is in said same position, the clamping device retains the same fully locked position, regardless of the rake and/or reach position of the steering wheel within the range of adjustment.

At least one end stop can be provided for the clamping mechanism to prevent over-travel of the or each lever.

At least one detent may be provided to hold the or each lever in a desired position.

A said detent and/or end stop may be provided between the second operating lever and a part that is fixed relatively to the vehicle body when the mechanism is installed. This fixed part may be the steering column mounting bracket.

The clamping mechanism may be configured that, in use, the operating handle of the second lever is pushed forwards, towards the dashboard, to move the clamping device to its clamped condition and is moved away from the dashboard to move the clamping device to its unclamped condition.

The second, operating lever, can be provided with a region of weakness between its operating handle and its interconnection with the first, actuating lever to allow for the possibility to fracture or deform in a predetermined manner, if struck by the driver, for example, in the event of vehicle crash.

The invention also extends to an adjustable steering column for a vehicle incorporating a clamping mechanism that is essentially as hereinbefore defined.

BRIEF DESCRIPTION OF THE DRAWINGS

For a better understanding of the invention and to show how the same may be carried into effect, reference will now be made, by way of example, to the accompanying drawings, in which:

FIG. 1A shows a detail of FIG. 1 with a possible end-stop and detent;

FIG. 2A shows a detail of FIG. 2, again showing the end-stop and detent;

DESCRIPTION OF THE PREFERRED EMBODIMENTS

Figure 1:
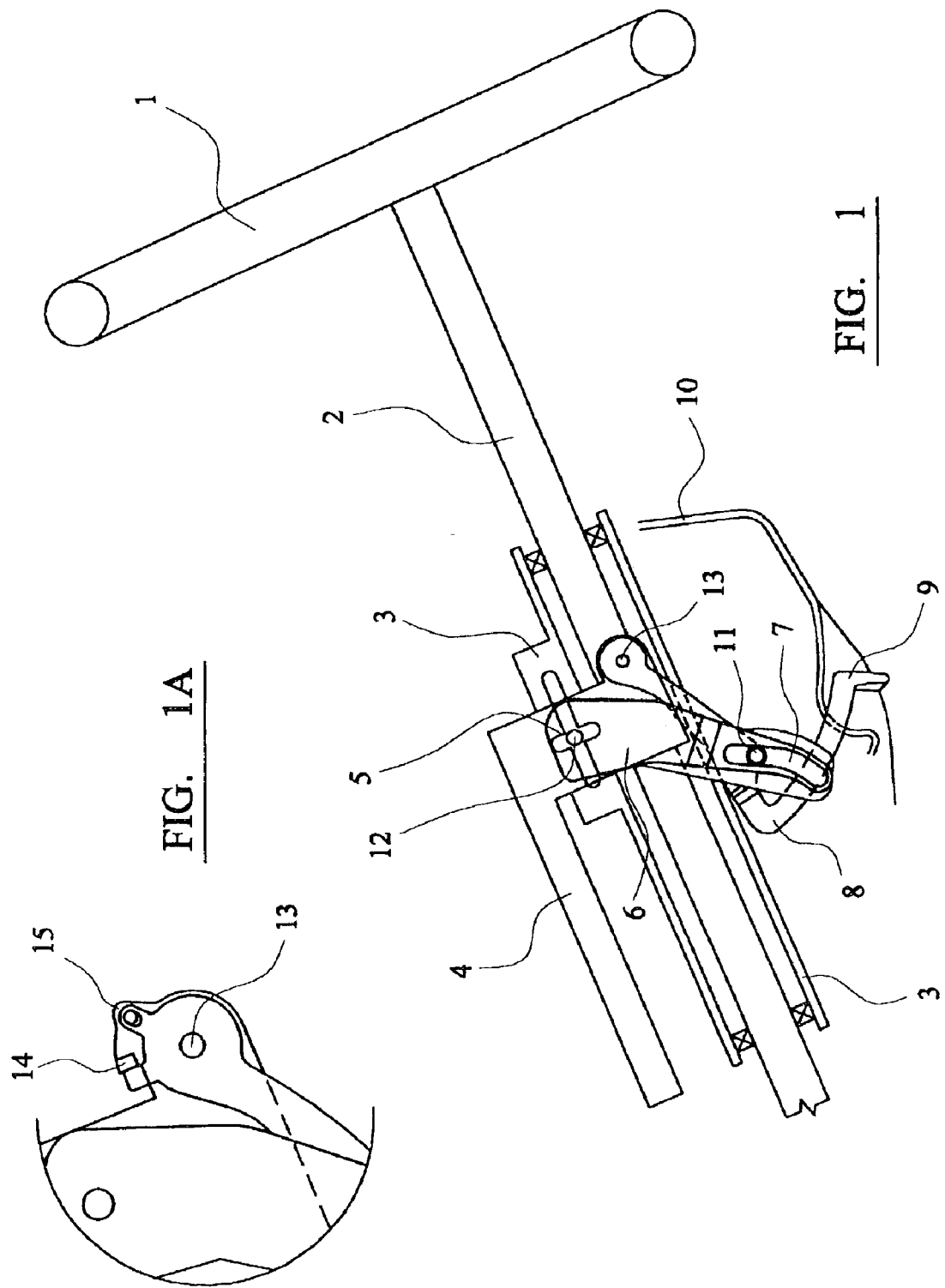
FIG. 1 is a diagrammatic side view of a clamping mechanism for an adjustable steering column for a vehicle, showing the levers of the clamping mechanism in a clamped condition.
Figure 2:
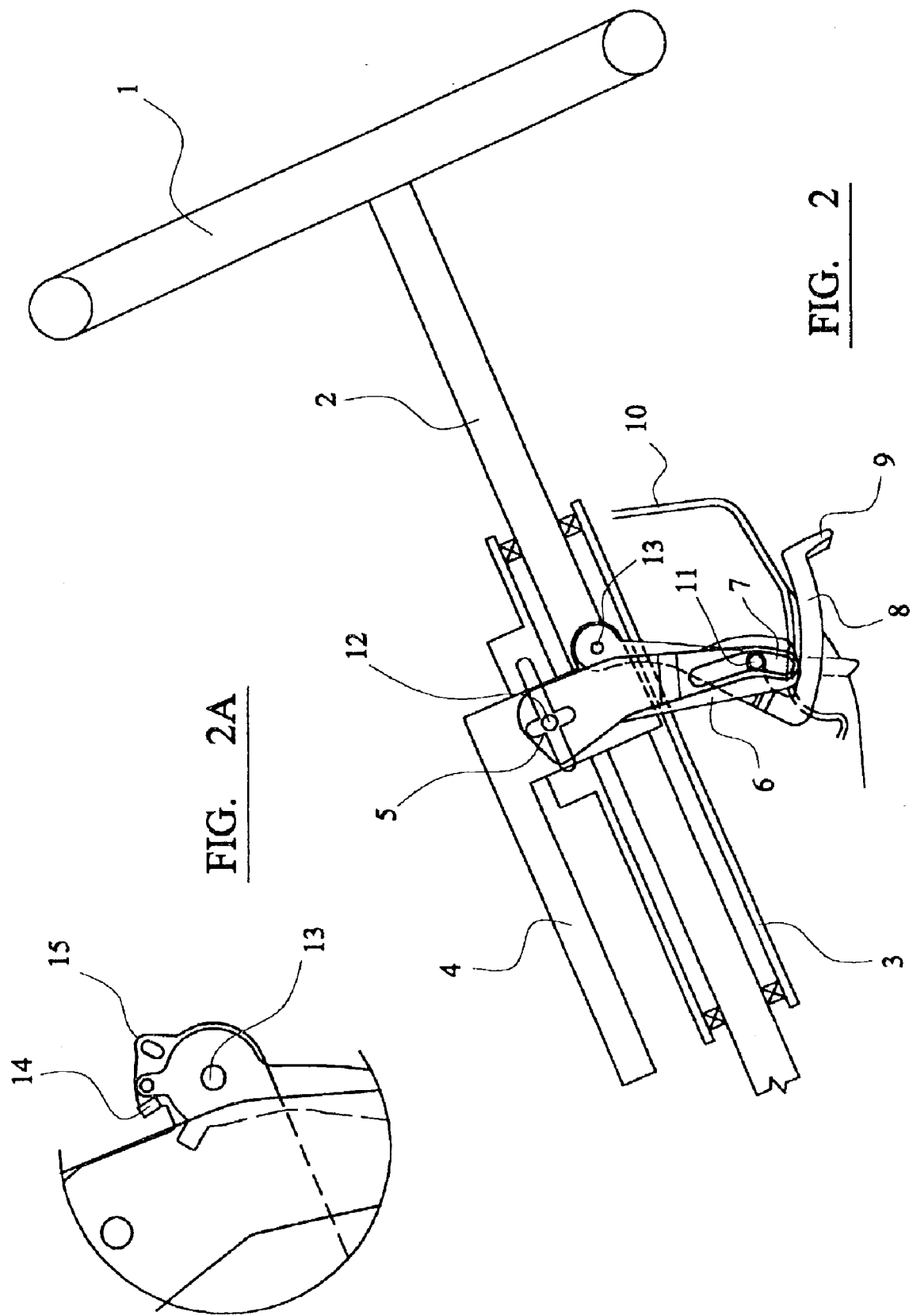
FIG. 2 is a view similar to FIG. 1 but showing the levers in an unclamped condition.

The drawings show an adjustable steering column with a steering wheel 1 mounted on an upper end of an upper steering column shaft 2 rotatably mounted in an outer tube 3 that is rake and reach adjustable. The outer tube 3 is mounted in known fashion on a steering column mounting bracket 4 that is itself mountable to a cross-beam (not shown) of a vehicle.

A steering column clamping device 5 may be in itself of a conventional type but, in the present case, the complete clamping mechanism includes a first, actuating lever 6 for actuating the clamping device 5 and moveable between a clamped and an unclamped condition of the clamping device 5. The actuating lever 6 is coupled to an operating lever 8, to which is mounted at a free end an operating handle 9. As can be seen in the drawings, the end of the operating lever 8 carrying the operating handle 9 extends through an aperture in a dashboard 10 of the vehicle so that the operating handle 9 lies within the cabin of the vehicle.

The actuating lever 6 has a guideway in the form of a curved slot 7 in it, slidably to accommodate a boss 11 of the operating lever 8 which thus is slidable in the slot 7 and forms the interconnection between the two levers.

The actuating lever 6, which acts to clamp and unclamp the clamping device 5, has an axis of rotation or fulcrum 12 which moves relative to the dashboard 10 during rake and/or reach adjustment. The actuating lever 6 is driven by the operating lever 8, which itself has an axis of rotation or fulcrum 13 whose position is fixed relatively to the dashboard. Force applied to the operating handle 9 is transmitted from the operating lever 8 to the actuating lever 6 by means of the boss 11 riding in the slot 7 and accordingly both rotational and sliding movement of the two levers relatively to each other is permitted.

Figure 3:
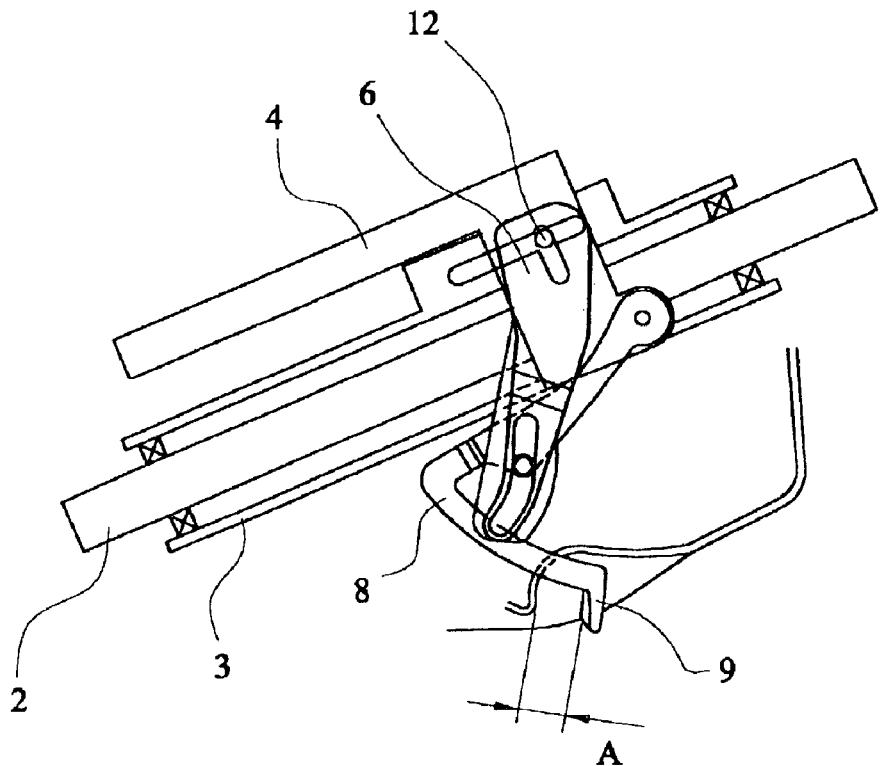
FIG. 3 is a view similar to FIG. 1 but showing the levers in a different clamped position.
Figure 4:
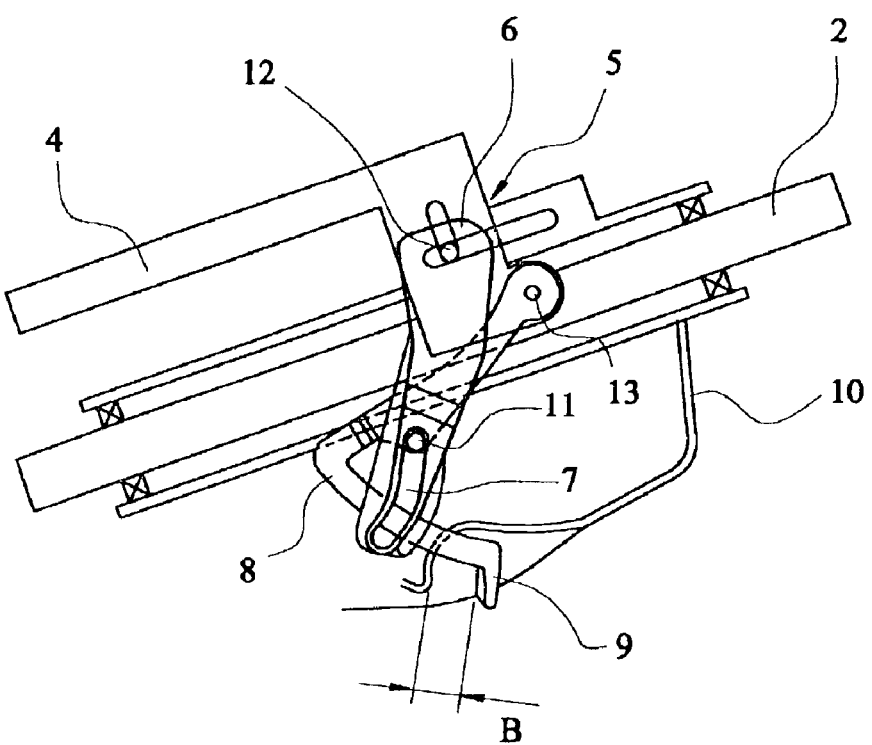
FIG. 4 is a view similar to FIG. 3 and illustrate for comparative purposes the clamping mechanism in its clamped condition with the two levers in yet another clamped positional relationship.

The geometry of the mechanism is configured such that when the adjustment system is fully locked, i.e. the clamping device is in its clamped condition to lock the outer tube 3 and hence the upper steering column 2 in the desired rake and/or reach position, the operating handle 9 always stops in the same position relatively to the dashboard 10, whilst at the same time, the clamping device 5 always returns to the same, fully locked position. This is true for all positions of the steering wheel 1 within the range of adjustment and this can be seen clearly from FIGS. 1, 3 and 4 and especially the latter two figures which show the steering column in two different positions of rake and reach adjustment. In each case, the operating handle 9 returns to the same position relatively to the dashboard 10 when clamped. Hence distance A in FIG. 3 equals distance B in FIG. 4. This is all achieved with just two inter-linked levers.

Clamping mechanisms for adjustable steering columns are often equipped with one or more end stops which prevent over-travel of the lever, and one or more detents whose purpose is to hold the lever in a certain position, for example, to prevent the adjustment from being accidentally unclamped when subject to vibration. If the axis of rotation of the clamping device and lever can move relatively to the other parts of the vehicle, then the end stops and detents will normally be incorporated in the clamping device and/or lever. This can lead to disadvantages. For example, in the case of end stops, an overload or abuse load applied to the handle must be reacted through the clamping device, with risk of damage to it. In the case of a detent which acts wholly or partially in the same direction as the clamping force, when the rotating part of the clamping device passes through or over the detent position into its rest position, there may be a reduction in clamping force.

However, with the present structure, if the geometry is configured as described above and shown in the drawings, then there exists the option of placing an end stop 14 and/or detent 15 between the operating lever 8 and an object which is fixed relatively to the vehicle body, for example, the steering column mounting bracket 4. In this way, since the end stop 14 and detent 15 are positioned remote from the clamping device, the two disadvantages just described are overcome, since the end stop will prevent over-travel of the lever 6 and/or 8. Similarly, when the detent is provided, it can be arranged to hold the lever 6 and/or 8 in a desired position.

As shown, the clamping mechanism is configured that, in use, the operating handle 9 of the lever 8 is pushed forwards (from the point of view of normal direction of the vehicle) towards the dashboard 10 to move the clamping device 5 to its clamped condition and is moved away from the dashboard 10 to move the clamping device 5 to its unclamped condition.

Nevertheless, the operating lever 8 and handle 9 may be positioned such that they may be struck by the knee or other part of the driver during a frontal impact of the vehicle. If the mechanism is configured such that a forward push on the handle acts to lock the clamping device 5 and if a robust end stop is provided on the operating lever 8, for example, as described above, then this will help to ensure that the clamping system remains locked and undamaged during the crash. However, the operating lever 8 can be provided with a region of weakness between its operating handle 9 and its interconnection 11 with the actuating lever 6 in order to allow for the possibility to fracture or deform in a predetermined manner, if struck by the driver, for example, in the event of crash, thus reducing the risk of injury. The arrangement may be such that the operating lever 8 fractures or deforms at a lower force than that required to break the end stop and this will help to ensure that the clamping system remains locked and undamaged during crash.

It will be appreciated that, with the present mechanism, because the locked position of the operating handle 8 is consistent relative to the dashboard 10, the aesthetics of the system are improved. The handle 9 may be styled to sit flush with the dashboard 10 when the column is clamped, for example. Additionally, this will give a clear indication to the driver that the column is, in fact, fully clamped. Furthermore, a smaller hole (or slot) is required in the dashboard 10 where the operating levers/handle protrudes, which is also an aesthetic improvement over the long slot sometimes used and also is an improvement for preventing noise ingress into the cabin.

The end stop has the advantage that excessive force applied to the handle 9 when in the locked position does not have to be reacted by the clamping device 5. Finally, the detent which may be used in the locked position which acts in a direction co-axially with the clamping force does so without reducing the clamping force as the detent position is passed.

In the present case, the actuating lever 6 has the curved guideway, while the operating lever 8 has the boss 11 which is slidable in the guideway for the interconnection between the two levers. However, this mechanism may be configured such that the operating lever 8 has the curved guideway, while the actuating lever 6 has the boss which is slidable in the guideway for the interconnection between the two levers.

We claim:

1. A clamping mechanism for an adjustable steering column for a vehicle, the clamping mechanism including:

a first actuating lever for actuating a clamping device having a first clamped condition and a second unclamped condition, the actuating lever being moveable between the clamped and unclamped conditions of the clamping device, and a second operating lever for operating said first lever, the two levers having an interconnection intermediate their ends such that one lever can pivot and slide relatively to the other at the interconnection;

said first lever having a moveable fulcrum to allow for adjustment of the steering column and said second lever having a fulcrum that is fixed, in use, relatively to a dashboard of the vehicle, said second lever having a part in the region of an end of said second lever that is remote from said fixed fulcrum to constitute an operating handle for the second lever.

2. A clamping mechanism according to claim 1, wherein the second lever has a pivot point and wherein the first lever is provided with a guideway in which said pivot point of the second lever can pivot and slide.

3. A clamping mechanism according to claim 2, wherein the guideway is curved.

4. A clamping mechanism according to claim 2, wherein the guideway is a slot in the first lever.

5. A clamping mechanism according to claim 2, wherein the first lever has one end that is remote from its fulcrum and wherein the guideway extends along the first lever, from near said one end that is remote from its fulcrum, and towards the fulcrum.

6. A clamping mechanism according to claim 5, wherein the fulcrum of the first lever is mounted so as to accommodate rake and/or reach adjustment of the steering column.

7. A clamping mechanism according to claim 5 and comprising a steering column mounting bracket having slots, wherein the fulcrum of the first lever passes through the slots in the steering column mounting bracket.

8. A clamping mechanism according to claim 7, wherein the second lever has a fixed mounting point on the steering column mounting bracket.

9. A clamping mechanism according to claim 1, wherein the clamping mechanism is mounted in a vehicle having a dashboard, so that the second lever extends through the dashboard of the vehicle, with the operating handle for the second lever being arranged to stop in a same position relative to the dashboard when the clamping device is in said first clamped condition.

10. A clamping mechanism according to claim 9, wherein, when said operating handle is in said same position relative to the dashboard when the clamping device is in said first clamped condition, the clamping device retains a same fully locked position, regardless of rake and/or reach position of a steering wheel of the steering column assembly within the range of adjustment.

11. A clamping mechanism according to claim 1, wherein at least one end stop is provided for the clamping mechanism to prevent over-travel of said first or second lever.

12. A clamping mechanism according to claim 1, wherein at least one detent is provided to hold said first or second lever in a desired position.

13. A clamping mechanism according to claim 11, wherein said end stop is provided between the second operating lever and a part that is fixed relatively to the vehicle body when the mechanism is installed.

14. A clamping mechanism according to claim 12, wherein said detent is provided between the second operating lever and a part that is fixed relatively to the vehicle body when the mechanism is installed.

15. A clamping mechanism according to claim 13, wherein said part that is fixed relatively to the vehicle body is a steering column mounting bracket.

16. A clamping mechanism according to claim 14, wherein said part that is fixed relatively to the vehicle body is a steering column mounting bracket.

17. A clamping mechanism according to claim 9, wherein the mechanism is configured, in use, such that the operating handle of the second lever is pushed forwards towards the dashboard, to move the clamping device to its clamping condition and is moved away from the dashboard to move the clamping device to its unclamped condition.

18. A clamping mechanism according to claim 1, wherein the second operating lever is weakened, between its operating handle and its interconnection with the first actuating lever, to allow for the possibility of fracture or deformation in a predetermined manner in the event of vehicle crash.

19. An adjustable steering column for a vehicle incorporating a clamping mechanism, the clamping mechanism including:

a first actuating lever for actuating a clamping device having a first clamped condition and a second unclamped condition, the actuating lever being moveable between the clamped and unclamped conditions of the clamping device, and a second operating lever for operating said first lever, the two levers having an interconnection intermediate their ends such that one lever can pivot and slide relatively to the other at the interconnection;

said first lever having a moveable fulcrum to allow for adjustment of the steering column and said second lever having a fulcrum that is fixed, in use, relatively to a dashboard of the vehicle, said second lever having a part in the region of an end of said second lever that is remote from said fixed fulcrum to constitute an operating handle for the second lever.

* * * * *